UNITED STATES PATENT OFFICE.

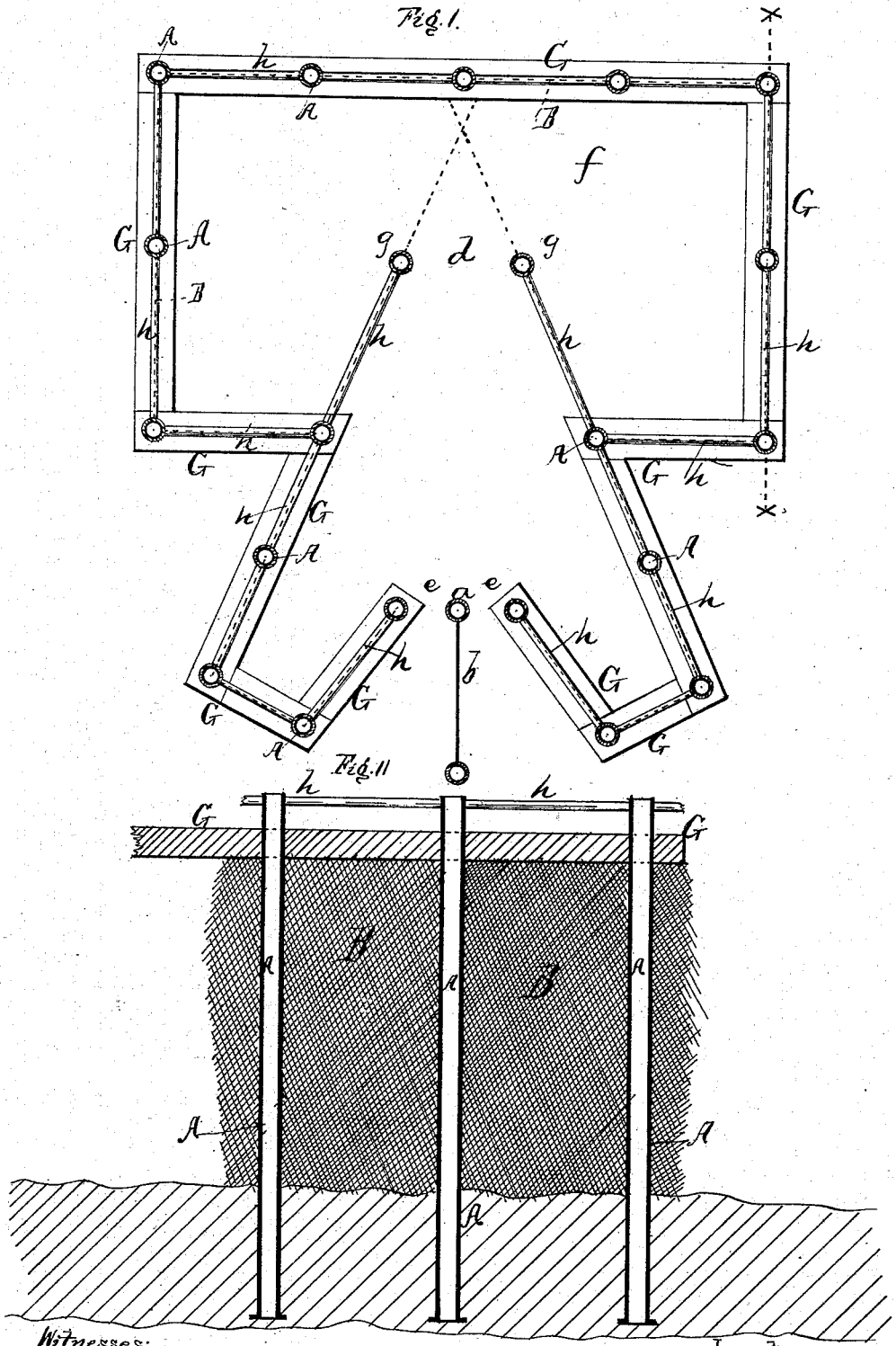

ALBERT N. HOXIE, OF FOXBOROUGH, MASSACHUSETTS, AND EDWARD COLLINS, OF NEW YORK, N. Y.

FISH-TRAP.

SPECIFICATION forming part of Letters Patent No. 252,466, dated January 17, 1882.

Application filed September 1, 1881. (No model.)

*To all whom it may concern:*

Be it known that we, ALBERT NICKERSON HOXIE, of Foxborough, county of Norfolk, State of Massachusetts, and EDWARD COLLINS, of the city, county, and State of New York, have invented new and useful Improvements in Fish-Traps; and we do hereby declare that the following is a clear and exact description of the same, reference being had to the accompanying drawings, forming a part of this specification.

The object of our invention is, first, to substitute hollow posts in the formation of a fish-trap; second, to strengthen the posts by means of a movable frame.

Referring to the drawings, Figure 1 is a plan view of a fish-trap embodying our invention. Fig. 2 is a sectional view on line $x\ x$, Fig. 1, of the same.

Letters A A represent a number of hollow posts, arranged as shown in Fig. 1. To these posts are fastened the net B. This arrangement forms what is called a "fish-trap," and may be constructed any distance from shore in any body of water. From post $a$ to the shore is placed the net $b$. Now, when the fish coming up or down the river strike the net $b$, they, not knowing whither to go, naturally follow the net $b$, and enter the opening $e$ of the trap, and also opening $d$ of the trap, until they find themselves in the inclosure $f$, through which they will swim until they are stopped by the net B around the inclosure, forming the outside of the trap. When the fish find they cannot go farther they will follow the net B; but when they come to point $g$, instead of going out of opening $d$, they will take an angular course, (shown in dotted lines,) and come against net B again. Thus when the fish are once in the inclosure $f$ they can never of themselves get free again.

The posts of fish-traps heretofore were made of wood driven down into the bed of the river in the same manner that wooden piles are driven down.

We employ hollow metal posts, as being more serviceable and better adapted to stand the wear and tear. We sink these hollow metal posts by hydraulic pressure, or by any other means. These posts are fastened together at their top by rod $h$.

G is a frame surrounding the posts A, and serving as a buoy, and attached loosely to the posts and permitted to slide up and down the same, or held in position by aid of set-screws or any other means.

What we claim is—

In a fish-trap, the posts A A, made hollow, and of metal, the said posts being arranged as shown, the rods $h$, the frame G, and the net B, all arranged and combined in the manner shown, and for the purpose set forth.

This specification signed this 16th day of June, 1880.

ALBERT NICKERSON HOXIE.
EDWARD COLLINS.

Witnesses:
F. BARRITT,
FREDK. B. SWIFT.